(12) United States Patent
Ghosh

(10) Patent No.: US 11,570,164 B2
(45) Date of Patent: Jan. 31, 2023

(54) SYSTEM AND METHOD OF SINGLE SIGN ON TO MASTER WEBSITE AND SILENT AUTHENTICATION FOR SUBSERVIENT WEBSITES

(71) Applicant: DELL PRODUCTS L.P., Round Rock, TX (US)

(72) Inventor: Kaushik Ghosh, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 535 days.

(21) Appl. No.: 16/526,616

(22) Filed: Jul. 30, 2019

(65) Prior Publication Data
US 2021/0037005 A1 Feb. 4, 2021

(51) Int. Cl.
*H04L 9/40* (2022.01)
*H04L 9/32* (2006.01)

(52) U.S. Cl.
CPC ........ *H04L 63/0815* (2013.01); *H04L 9/3213* (2013.01); *H04L 9/3242* (2013.01); *H04L 9/3247* (2013.01); *H04L 63/0884* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 7,222,362 B1 | 5/2007 | Canetti et al. | |
| 8,434,129 B2 | 4/2013 | Kannappan et al. | |
| 8,544,069 B1 * | 9/2013 | Subbiah | G06F 21/41 726/4 |
| 2006/0020679 A1 * | 1/2006 | Hinton | H04L 63/0815 709/217 |
| 2006/0021017 A1 * | 1/2006 | Hinton | H04L 63/0815 726/10 |
| 2006/0021018 A1 * | 1/2006 | Hinton | H04L 63/0815 726/10 |
| 2006/0048216 A1 * | 3/2006 | Hinton | H04L 63/0815 726/8 |
| 2006/0129817 A1 | 6/2006 | Borneman et al. | |

(Continued)

FOREIGN PATENT DOCUMENTS

| | | | | |
|---|---|---|---|---|
| CN | 103716292 A | * | 4/2014 | ............. G06F 21/41 |
| CN | 111052706 A | * | 4/2020 | ........... G06F 21/335 |

(Continued)

OTHER PUBLICATIONS

"JSON Web Token (JWT) Signing Algorithms Overview"; Dec. 17, 2015, 4 pages.

*Primary Examiner* — Arezoo Sherkat
(74) *Attorney, Agent, or Firm* — Egan, Enders & Huston LLP

(57) ABSTRACT

Systems and methods are provided that may be implemented as an identity management system to provide a single sign on to a master website and silent authentication for subservient websites. The identity management system may include an identity provider server and a user management server. The identity provider server may authenticate a user, redirect an authenticated user to the user management server, and receive and verify a silent authentication request including a cryptographic signature and a modified message on behalf of the authenticated user from the user management server.

25 Claims, 4 Drawing Sheets

(56) References Cited

U.S. PATENT DOCUMENTS

| | | | | |
|---|---|---|---|---|
| 2008/0168539 | A1* | 7/2008 | Stein | H04L 63/0815 |
| | | | | 726/5 |
| 2014/0230027 | A1* | 8/2014 | Cha | H04L 63/0815 |
| | | | | 726/5 |
| 2014/0310792 | A1* | 10/2014 | Hyland | H04L 63/0815 |
| | | | | 726/8 |
| 2014/0317716 | A1* | 10/2014 | Chao | H04L 63/0815 |
| | | | | 726/9 |
| 2019/0007409 | A1* | 1/2019 | Totale | H04L 63/102 |
| 2019/0069168 | A1* | 2/2019 | Belote | G06F 21/41 |
| 2019/0372960 | A1* | 12/2019 | Huang | G06F 21/6218 |
| 2020/0067907 | A1* | 2/2020 | Avetisov | H04L 63/0815 |
| 2021/0243026 | A1* | 8/2021 | Mohassel | H04L 9/3236 |

FOREIGN PATENT DOCUMENTS

| | | | | |
|---|---|---|---|---|
| CN | 109639687 B | * | 5/2021 | G06F 16/86 |
| WO | WO-2014091168 A2 | * | 6/2014 | G06F 21/44 |

\* cited by examiner

SYSTEM AND METHOD OF SINGLE SIGN ON TO MASTER WEBSITE AND SILENT AUTHENTICATION FOR SUBSERVIENT WEBSITES

FIELD

This invention relates generally to information handling systems and, more particularly, to single sign on and authentication for websites.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

More and more businesses are deploying applications and services to the cloud. With the proliferation of cloud services and its usage, companies are increasingly leveraging PaaS (Platform as a Service). PaaS provides managed services to solve complex business problems and also to perform proof of concepts very quickly without having to set up a large infrastructure along with teams for supporting and maintaining the infrastructure on a nonstop basis. PaaS is a cloud computing model in which a third-party provider or the like delivers hardware and software tools, such as, for example, those needed for application development, to users over the Internet. A PaaS provider may host the hardware and software on its own infrastructure, or may provide access to multiple websites at one or more remote locations. As more and more businesses deploy applications and services to the cloud, there is an ever growing need to provide security for these applications and services.

SUMMARY

Disclosed herein are systems and methods that may be implemented to provide a single sign on to a master website and silent authentication for subservient websites. In one embodiment security may be provided for cloud management services that are configured for sharing information. In this way, the disclosed systems and methods may be implemented in one embodiment to satisfy security requirements for applications and services, which are increasingly being deployed by businesses to the cloud.

In one embodiment, an identity management system may be provided that includes an identity provider server and a user management server. The identity provider server authenticates a user, redirects an authenticated user to a user management server, receives and verifies a silent authentication request on behalf of the authenticated user from the user management server, in which the silent authentication request includes a cryptographic signature and a modified message, and provides a site token to access a requested resource when the silent authentication request is verified. The user management server presents a resource page to the authenticated user, converts a resource request from the authenticated user into the silent authentication request by applying a cryptographic function to a message to provide the cryptographic signature and by applying a modification to the message to provide the modified message, sends the silent authentication request to the identity provider server, and redirects the authenticated user to the requested resource when the site token is provided. The cryptographic function and the modification are known only by the identity provider server and the user management server relative to external users.

The message and the modified message may both include one or more parameters, in which the modified message includes a modified parameter used to obscure the message when transmitted from the user management server to the identity provider server. The modification may include at least one math function that uses at least one modifier variable that is applied to at least one parameter to generate the modified parameter. The user management server may apply the at least one math function using the at least one modifier variable to at least one parameter to generate at least one modified parameter. The identity provider server may apply an inverse of the at least one math function using the at least one modifier variable to the at least one modified parameter to generate at least one original parameter used to regenerate the original message. The cryptographic function may be a cryptographic hash function or the like applied to the message using a secret key to generate the cryptographic signature.

The identity management system may include a federation server and a data store system. The federation server is accessed by the identity provider server to obtain an identity token to authenticate the user when the user is a resource administrator or a privileged consumer. The data store system is accessed by the identify provider to obtain an identity token to authenticate and authorize the user when the user is a resource consumer. Resource administrators and privileged consumers may be authenticated based on a predetermined trust relationship identified by access to an internal login link. The resource consumer may be authenticated based on user credentials provided by the user.

The identity management system may include one or more subservient web servers that host multiple applications accessible by the identity management system via a network interface. The message may identify a subservient web server and a corresponding application as the requested resource. The identity provider server may provide a site token to the identified subservient web server to enable access to a requested application by the authenticated user.

An information handling system according to one embodiment may include a processing device and a memory storing an authentication application, which when executed by the processing device configures the information handling system into a silent authentication system. The silent authentication system processes a silent authentication request by performing a cryptographic function on a message to provide a cryptographic signature, and by translating between the message and a modified message by applying a modification to one of the message and the modified message.

The message and the modified message may each include at least one parameter, in which the modification may be at least one math function that uses at least one modification variable to modify at least one parameter of the message.

The authentication application may be a user management application that configures the information handling system into a user management server. In this case the user management server applies the cryptographic function (e.g., a hash function using a secret key) to the message to provide the cryptographic signature, applies the modification to the message to provide the modified message, and sends or transmits the cryptographic signature and the modified message as the silent authentication request, e.g., to an identity provider server. The message may include at least one parameter, and the message modification may include at least one math function that uses at least one modifier variable to modify the at least one parameter of the message to convert the message into the modified message. The identity provider server reverses the modification by applying at least one inverse math function to regenerate the message, applies the cryptographic function to the regenerated message, and compares the regenerated message with the received message for authentication. The identity provider server provides a valid token to the requested subservient web server.

The authentication application may be an identification provider application that configures the information handling system into an identity provider server. In this case the identity provider server receives the silent authentication request including the cryptographic signature and the modified message, applies the modification to the modified message to regenerate the original message, applies the cryptographic function to the original message to generate a new cryptographic signature, and compares the new cryptographic signature with the received cryptographic signature to authenticate the silent authentication request. The modified message may include at least one modified parameter, in which the modification may be at least one inverse math function that uses at least one modifier variable to convert the at least one modified parameter into at least one original parameter to regenerate the message from the modified message.

A method according to one embodiment includes applying a cryptographic function on a message to provide a cryptographic signature, modifying a message by applying a modification to provide a modified message, and sending the cryptographic signature and the modified message as a silent authentication request. The method may include applying at least one math function using at least one modifier variable to at least one parameter of the message. The method may include applying a cryptographic hash function to the message using a secret key to generate the cryptographic signature.

The method may include receiving the silent authentication request, reversing the modification to the modified message to regenerate the message, applying the cryptographic function on the regenerated message to provide a new cryptographic signature, and comparing the received cryptographic signature with the new cryptographic signature to authenticate the silent authentication request. The method may include applying an inverse of at least one math function using at least one modifier variable on at least one parameter of the modified message.

In one respect, disclosed herein is an identity management system, including: an identity provider server that authenticates a user, that redirects an authenticated user to a user management server, that receives and verifies a silent authentication request on behalf of the authenticated user from the user management server wherein the silent authentication request includes a cryptographic signature and a modified message, and that provides a site token to access a requested resource when the silent authentication request is verified; and a user management server that presents a resource page to the authenticated user, that converts a resource request from the authenticated user into the silent authentication request by applying a cryptographic function to a message to provide the cryptographic signature and by applying a modification to the message to provide the modified message, that sends the silent authentication request to the identity provider server, and that redirects the authenticated user to the requested resource when the site token is provided. The cryptographic function and the modification may be known only by the identity provider server and the user management server.

In another respect, disclosed herein is an information handling system, including: a programmable integrated circuit; and a memory storing an authentication application, which when executed by the programmable integrated circuit configures the information handling system into a silent authentication system. The silent authentication system processes a silent authentication request by performing a cryptographic function on a message to provide a cryptographic signature, and by translating between the message and a modified message by applying a modification to one of the message and the modified message.

In another respect, disclosed herein is a method, including: applying a cryptographic function on a message to provide a cryptographic signature; modifying a message by applying a modification to provide a modified message; and sending the cryptographic signature and the modified message as a silent authentication request.

DESCRIPTION OF ILLUSTRATIVE EMBODIMENTS

Figure 1:
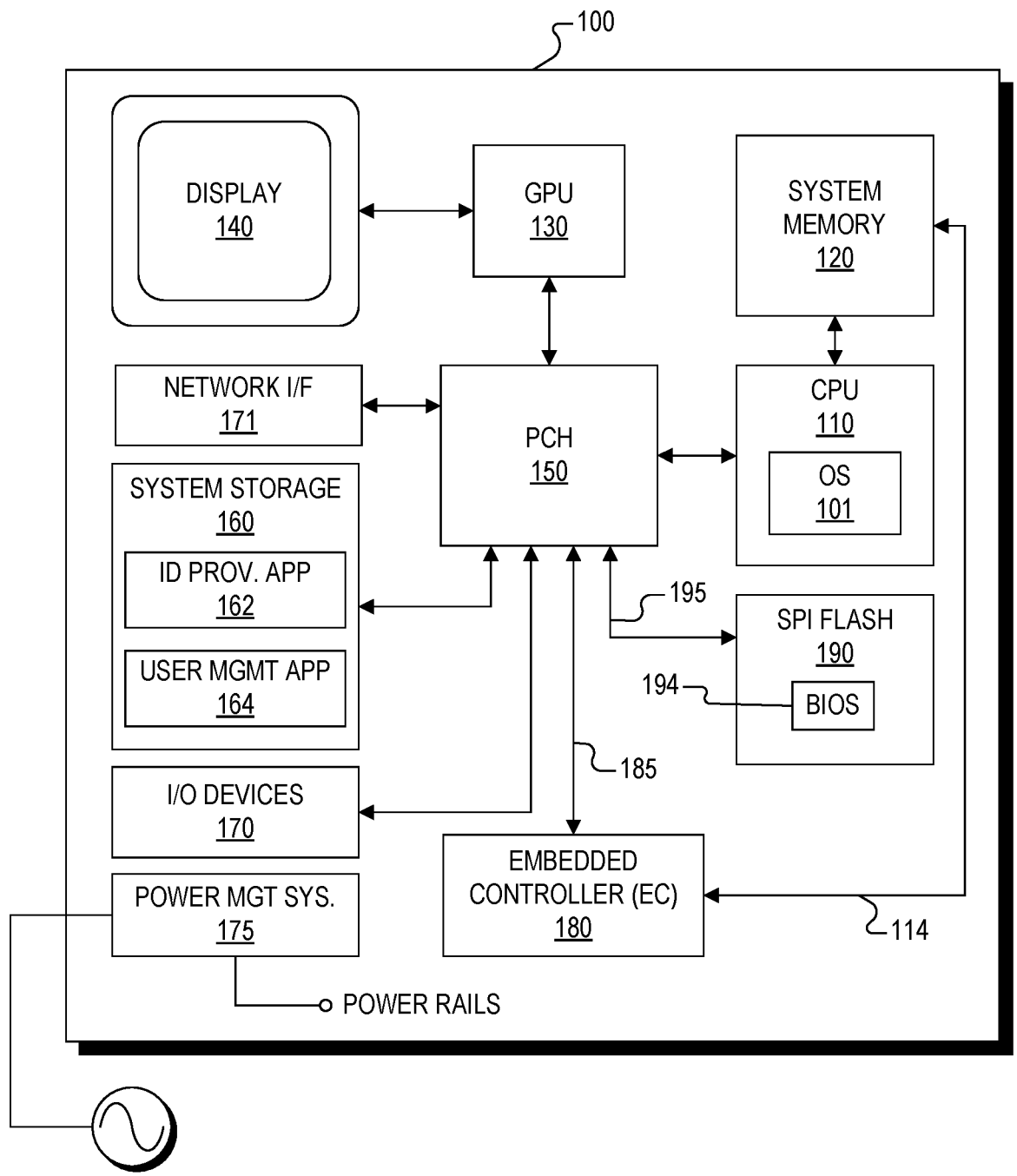
FIG. 1 is a block diagram of an information handling system according to one exemplary embodiment of the disclosed systems and methods.

FIG. 1 is a block diagram of an information handling system 100 (e.g., a desktop computer, laptop computer, tablet computer, MP3 player, personal data assistant (PDA), cell phone, etc.) as it may be configured according to one embodiment of the present disclosure. In this regard, it should be understood that the configuration of FIG. 1 is exemplary only, and that the disclosed methods may be implemented on other types of information handling systems. It should be further understood that while certain components of an information handling system are shown in FIG. 1 for illustrating embodiments of the present disclosure, the information handling system is not restricted to including only those components shown in FIG. 1 and described below.

As shown in FIG. 1, information handling system 100 may generally include a host processing device 110 (e.g., programmable integrated circuit such as a central processing unit (CPU)), for executing an operating system (OS) 101 (e.g., Microsoft Windows-based OS such as Windows 10, Linux OS, etc.) for system 100, executing user software applications, etc. CPU 110 may also be configured to access non-volatile serial peripheral interface (SPI) Flash memory 190 to load and boot a system BIOS 194 as shown. CPU 110 may include any type of processing device, such as an Intel Pentium series processor, an Advanced Micro Devices (AMD) processor or another programmable integrated circuit. CPU 110 is coupled to system memory 120, which may include, for example, random access memory (RAM), dynamic RAM (DRAM), synchronous DRAM (SDRAM). In some embodiments, tasks and functions of SPI Flash 190 described herein may be performed by any other suitable one or more non-volatile memory (NVM) devices, e.g., including solid state drive/s (SSDs), hard drive/s, etc.

In some embodiments, information handling system 100 may include other types of processing devices including, but not limited to, a graphics processor unit (GPU) 130, a graphics-derivative processor (such as a physics/gaming processor), a digital signal processor (DSP), etc. Although GPU 130 is shown as a separate processing device in the embodiment of FIG. 1, GPU 130 may be omitted in other embodiments, when the functionality provided thereby is integrated within CPU 110 in a system-on-chip (SoC) design. In FIG. 1, display device 140 (e.g., LCD display or other suitable display device) is coupled to graphics processing unit (GPU) 130 to provide visual images (e.g., a graphical user interface, static images and/or video content) to the user. GPU 130 is, in turn, coupled to CPU 110 via platform controller hub (PCH) 150.

PCH 150 controls certain data paths and manages information flow between components of the information handling system 100. As such, PCH 150 may include one or more integrated controllers or interfaces for controlling the data paths connecting PCH 150 with CPU 110, GPU 130, system storage 160, input/output (I/O) devices 170, network interface (I/F) 171, embedded controller (EC) 180 and SPI Flash memory device 190 where BIOS firmware image (e.g., BIOS 194) is stored. In one embodiment, PCH 150 may include a Serial Peripheral Interface (SPI) controller and an Enhanced Serial Peripheral Interface (eSPI) controller. In some embodiments, PCH 150 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface.

System storage 160 (e.g., one or more media drives, such as hard disk drives, optical drives, NVRAM, Flash memory, solid state drives (SSDs), or any other suitable form of internal or external storage) is coupled to PCH 150 to provide permanent local storage for information handling system 100. I/O devices 170 (e.g., a keyboard, mouse, touchpad, touchscreen, etc.) are coupled to PCH 150 to enable the user to interact with information handling system 100, and to interact with application programs or other software/firmware executing thereon. The network I/F 171 enables communication with remote devices and servers or the like via external networks (not shown).

A power source for the information handling system 100 may be provided via an external power source (e.g., mains power) and an internal power supply regulator, and/or by an internal power source, such as a battery. As shown in FIG. 1, power management system 175 may be included within information handling system 100 for moderating the available power from the power source. In one embodiment, power management system 175 may be coupled to provide operating voltages on one or more power rails to one or more components of the information handling system 100, as well as to perform other power-related administrative tasks of the information handling system. For example, power management system 175 may be coupled to provide an operating voltage on a primary power rail to PCH 150, and may be further coupled to provide an operating voltage (e.g., 3.3V) on another power rail to EC 180. In addition to the power rails explicitly shown in FIG. 1, it is noted that power management system 175 may be coupled to provide additional operating voltages on one or more additional power rails to PCH 150, EC 180 and other components of information handling system 100.

Embedded controller (EC) 180 is coupled to PCH 150 and may be configured to perform functions such as power/thermal system management, etc. EC 180 may also be configured to execute program instructions to boot information handling system 100, load application firmware from SPI Flash memory device 190 into internal memory, launch the application firmware, etc. In one example, EC 180 may include a processing device for executing program instructions to perform the above stated functions. Although not strictly limited to such, processing device of EC 180 may be implemented as a programmable integrated circuit (e.g., a controller, microcontroller, microprocessor, ASIC, etc., or as a programmable logic device "PLD" such as FPGA, complex programmable logic device "CPLD", etc.).

As shown in FIG. 1, EC 180 is coupled to PCH 150 via data bus 185, and SPI Flash memory device 190 is coupled to PCH 150 via data bus 195. According to one embodiment, data bus 195 is a Serial Peripheral Interface (SPI) bus, and data bus 185 is an Enhanced Serial Peripheral Interface (eSPI) bus. In the embodiment shown in FIG. 1, SPI Flash memory device 190 is a shared Flash memory device, which is connected to PCH 150 and EC 180. In such a configuration, PCH 150 provides EC 180 shared access to SPI Flash memory device 190 via eSPI bus 185, SPI bus 195 and various interface and logic blocks included within the PCH.

Figure 2:
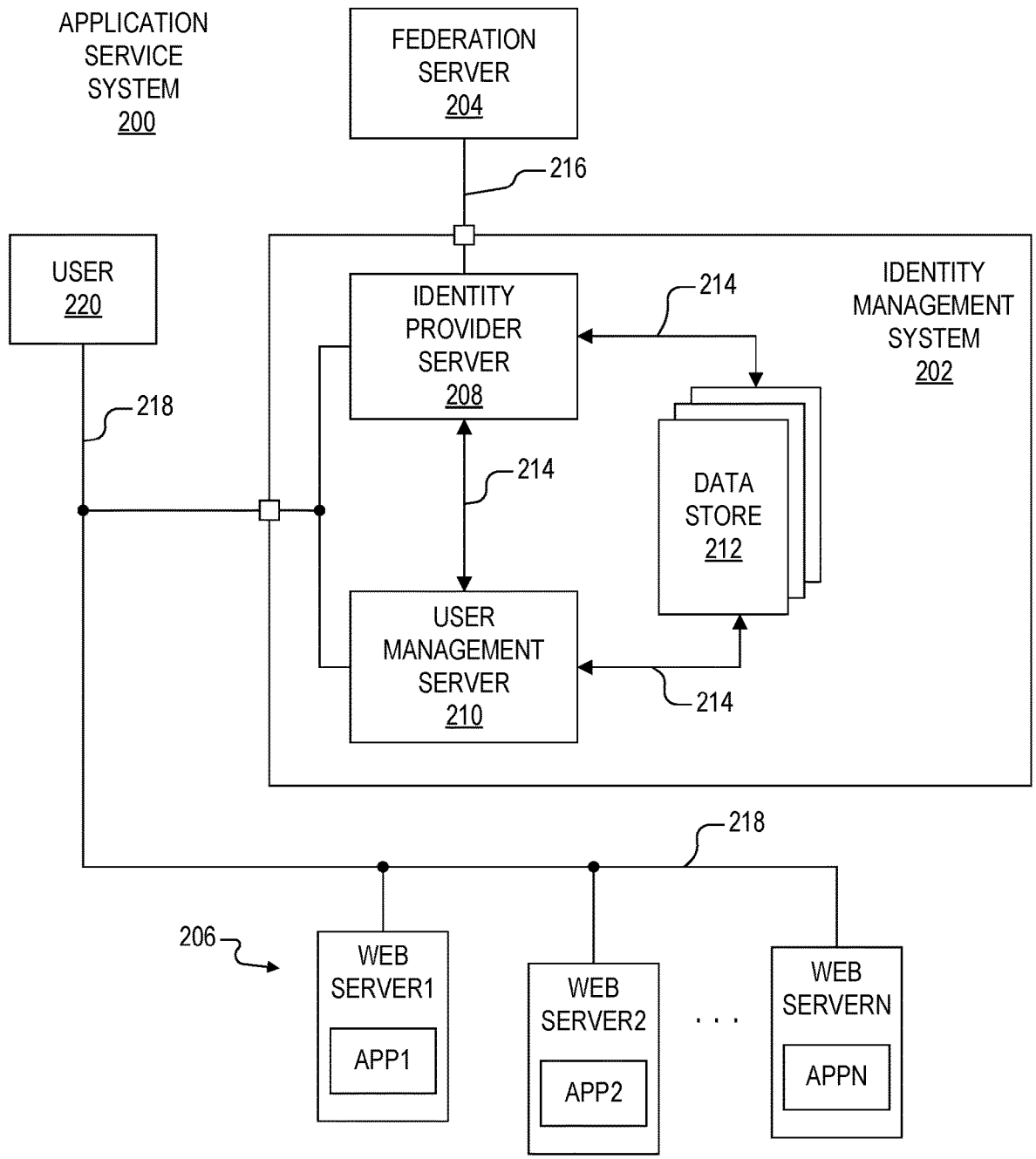
FIG. 2 is a simplified block diagram of an application service system including an identity management website implemented according to one exemplary embodiment of the disclosed systems and methods.

The system storage 160 stores an identification (ID) provider application (PROV. APP) 162 and a user management (MGMT) APP 164. The identification provider application 162 may be invoked and executed by the CPU 110 to configure the information handling system 100 as an identity provider server as further described herein, such as an identity provider server 208 (FIG. 2). Alternatively, the user management application 164 may be invoked and executed by the CPU 110 to configure the information handling system 100 as a user management server as further described herein, such as a user management server 210 (FIG. 2). In an alternative embodiment, the identification provider application 162 and the user management application 164 may be incorporated into a single application this is configured to either operate the information handling system 100 as an identity provider server or as a user management server. Both applications 162 and 164 are authentication applications that, when executed, configure the information handling system 100 into a silent authentication system for processing silent authentication requests as further described herein, in which the user management application 164 formulates silent authentication requests to send and the identification provider application 162 processes received silent authentication requests to perform authentication.

FIG. 2 is a simplified block diagram of an application service system 200 including an identity management system 202 implemented according to one embodiment of the present disclosure. The application service system 200 includes the identity management system 202, a federation server 204, and one or more or "N" subservient web servers 206, shown individually as WEB SERVER1, WEB SERVER2, . . . , WEB SERVERN, each running a corresponding application, shown as APP1, APP2, . . . , APPN, respectively. Although only one application is shown for each web server 206, it is understood that each web server 206 may include any number of applications. Examples of applications include bill of materials data, bill of materials analytics, device reports, supplier scoring, diagnostic apps, etc. The identity management system 202 includes the identity provider server 208, the user management server 210, and a data store system 212, which communicate with each other across a communication interface 214. The data store system 212 may include one or more computer servers or the like that provide user credentials and access data as further described herein.

The configuration of the communication interface 214 may depend upon the relative locations of the servers 208 and 210 and the data store system 212 and may incorporate a combination of communication methods. When co-located, such as within a common data center or the same building or location, the communication interface 214 may include a local bus communication system or a local area network (LAN) or the like. When remotely located, the communication interface 214 may include a wide area network (WAN), such as, for example, the Internet. The identity provider server 208, the user management server 210, and the data store system 212 of the identity management system 202 appear and collectively operate as a master website for authenticating users, such as a user 220, and for allowing access by authorized users to resources of the application service system, including content of the application service system 200 and the applications APP1-APPN hosted by the subservient web servers 206.

The identity provider server 208 communicates with the federation server 204 via a communication interface 216, which may be an extension of the communication interface 214 or may be a separate communication interface. In one embodiment, the federation server 204 may be positioned behind a firewall or other security configuration, yet has a predetermined trust relationship with the identity provider server 208. The federation server 204 is part of or otherwise owned or controlled by an entity that manages the server platform 200, in which the managing entity may be any group or organization, such as a corporation, a company, a governmental organization, an association, etc.

The user management server 210 communicates with the web servers 206 via another communication interface 218, which is typically a WLAN or Internet connection, although any suitable network is contemplated. In one embodiment, the identity management system 202 sits behind a firewall relative to the communication interface 218.

The user 220 is shown coupled to the communication interface 218 for accessing at least one of the web servers 206 to use or otherwise manage at least one of the web applications APP1-APPN. Each user, including the user 220, is any one of three different user types, in which the user types may include a resource administrator, a privileged consumer and a resource consumer. Resource administrators and privileged consumers may be employees or contractors or other trusted persons of the entity that manages server platform 200. A resource administrator is a user that provides content, edits content, or otherwise generally manages the content of the web applications as resources of the application service system 200. Privileged consumers and resource consumers are users that use the information or services provided by any one or more of the applications APP1-APPN for purposes of troubleshooting, determining the health of, or otherwise to repair or improve operation or performance of a device or other computer system.

The user 220 requests access to a resource of the server platform 200, such as by clicking a link or by submitting a web address or the like for accessing any one of the web servers 206. The user 220 is directed or otherwise redirected to the identity provider server 208, which verifies or authenticates the user 220 as further described herein. When the user 220 is a resource administrator or a privileged consumer, then the credentials are provided by the federation server 204 to the identity provider server 208 for authentication. When the user 220 is instead a resource consumer or any other authorized person external to the managing entity but who is registered and authorized to access the resources of the server platform 200, then the credentials may be stored within and provided by the data store system 212. The data store system 212 also provides access information for each user, including resource administrators and consumers. The access information determines access to the resources of the server platform 200, such as authorization on the web application servers 206. The resource administrators, for example, may have unlimited read and write access to the applications and resources. The privileged consumers may have limited write access to only a particular application/resource (or only a subset of the applications/resources) and unlimited read access to the applications and resources. Resource consumers may have a designated range of access from limited read access to full read access (e.g., without any write access), up to full read and write access to all the applications and resources depending upon the particular user and configuration.

Once the user 220 is verified or otherwise authorized, the user 220 is redirected to a page or the like provided the user management server 210 as further described herein, which provides links or the like to authorized resources, including, for example, links or access to any one or more of the web application servers 206. When the user 220 selects a link to access one of the web application servers 206 or other resources of the server platform 200, the server system 202 performs silent authentication to enable the user 220 to access the requested resource as further described herein.

Figure 3:
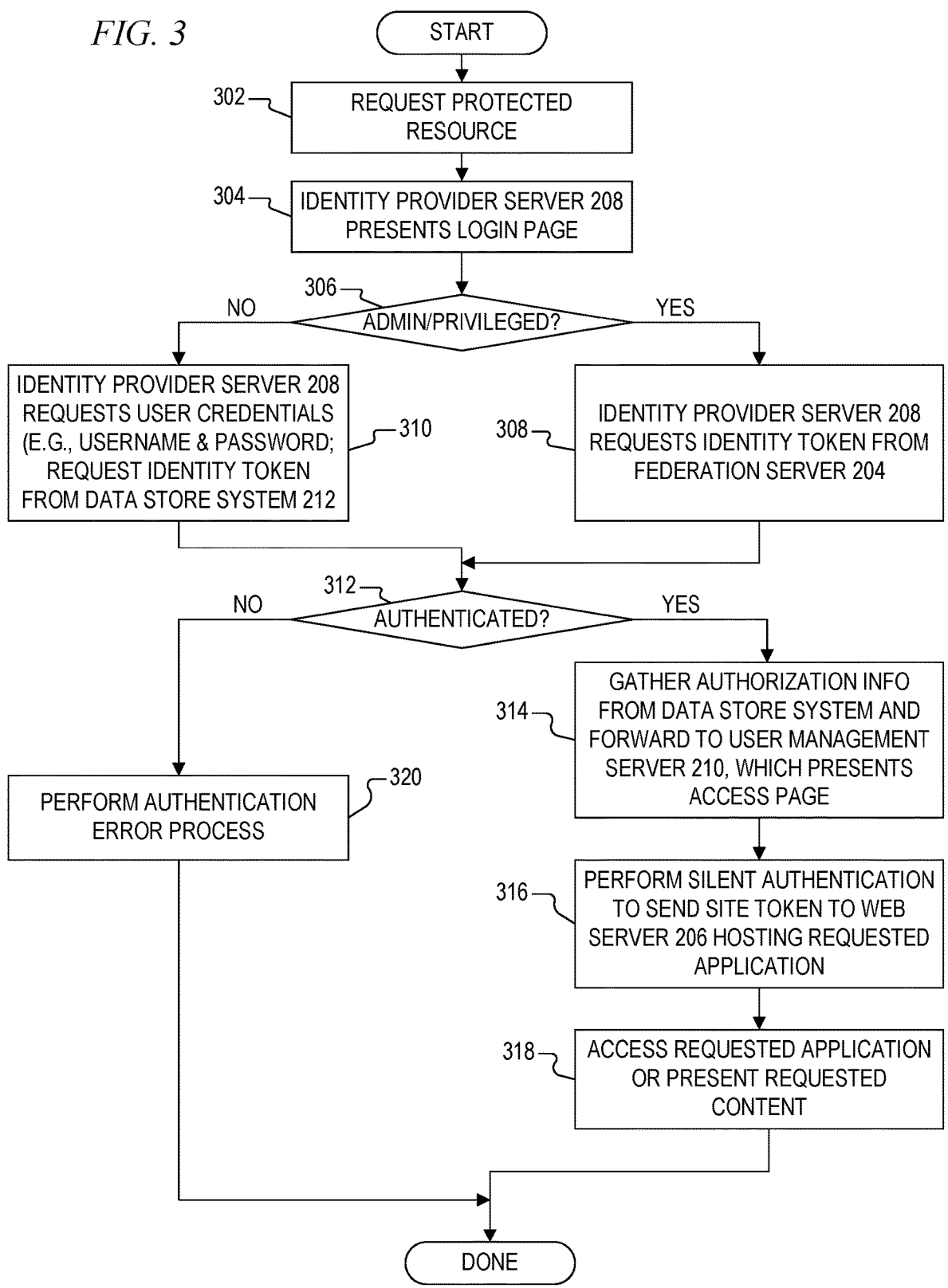
FIG. 3 is a flowchart diagram illustrating a login process for accessing the server platform of FIG. 2 according to one exemplary embodiment of the disclosed systems and methods.

FIG. 3 is a flowchart diagram illustrating a login process for accessing the server platform 200 according to one embodiment of the present disclosure. At a first block 302, the user 220 requests a protected resource server platform 200, such as any one of the applications APP1-APPN. At next block 304, the identity provider server 208 presents a login page to the user 220. A resource administrator or privileged consumer typically has access to a trusted computer system or the like hosted on the cloud or public domain name service (DNS) that is known and trusted by the managing entity of the server platform 200. If so, then the identity provider server 208 detects that the user 220 is a resource administrator or privileged consumer and provides a login page with an internal login link. If the user 220 is accessing a computing system that is external and not an internally trusted system, then the identity provider server 208 detects that the user 220 is a resource consumer and provides a login page that requests user credentials, such as a username and corresponding password.

At next block 306, it is determined whether the user 220 is a resource administrator (e.g., ADMIN) or privileged consumer versus a resource consumer. If the user 220 is identified as a resource administrator or privileged consumer, then operation advances to block 308 in which the identity provider server 208 detects activation of the internal login link and forwards corresponding user information to the federation server 204 to request an identity token. If instead the user 220 is identified as a resource consumer, then operation advances to block 310 in which the identity provider server 208 requests user credentials from the user 220, such as, for example, a username and password, and the identity provider server 208 forwards the user credentials to the data store system 212 to request an identity token.

After block 308 or 310, operation advances to query block 312 to determine whether the user 220 is authenticated. If the user 220 is a resource administrator or privileged consumer who is authenticated by the federation server 204, then the federation server 204 validates the user 220 and provides the corresponding identity token to the identity provider server 208. If the user 220 is a resource consumer, then the data store system 212 validates the user 220 and provides the corresponding identity token to the identity provider server 208. If authenticated, then operation advances to block 314 in which access information is retrieved from the data store system 212 by identity provider server 208 and forwarded to the user management server 210, which presents a resource page to the user 220. The resource page presents links to resources for which the user 220 is authorized to access, such as links to one or more of the applications APP1-APPN provided on the corresponding web servers 206.

When the user 220 selects an authorized link from the resource page provided by the user management server 210, then operation advances to block 316 in which the user management server 210 and the identity provider server 208 cooperate to perform a silent authentication process as further described herein. The silent authentication process acquires a resource or site token for the requested application, in which the site token is provided to the corresponding web server 206 that hosts the requested application or the requested content. At next block 318, the requested application is accessed by the user 220 or content from the accessed web server 206 is presented to the user 220, and operation is completed. It is noted, of course, that once authenticated, the user 220 may access additional requested resources and content before completing operation.

Referring back to block 312, if for any reason the user 220 is not successfully authenticated, then operation advances instead to block 320 to perform an authentication error process and operation is completed. If, for example, the incorrect user credential information is provided, then the process may be repeated a limited number or even an indefinite number of times to determine whether the user 220 is, in fact, an authorized user. If the login attempt is unsuccessful, then the user 220 is prevented from accessing any of the resources of the application service system 200.

Figure 4:
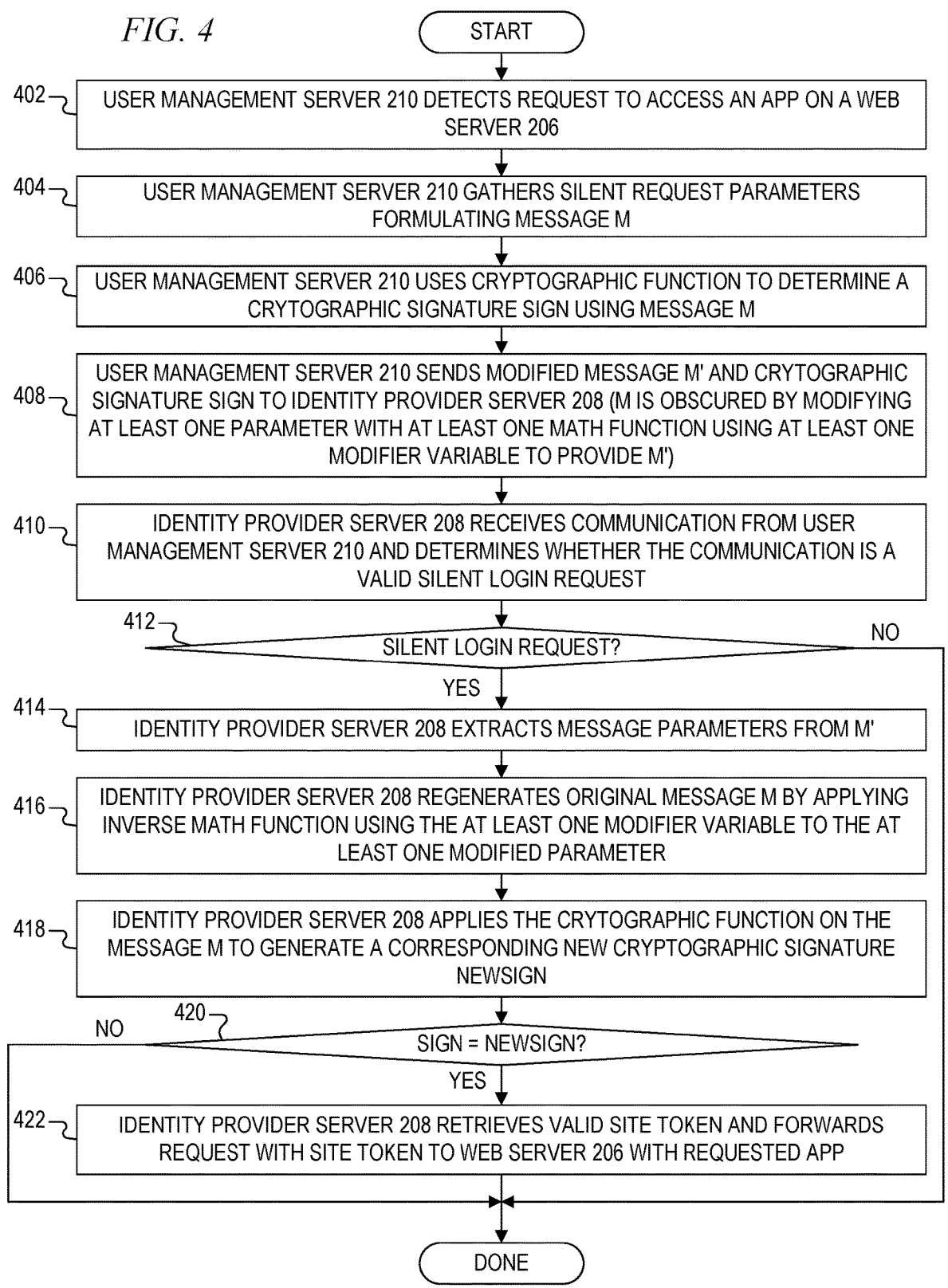
FIG. 4 is a flowchart diagram illustrating a method of accessing the applications APP1-APPN of the subservient web servers of FIG. 2 using silent authentication implemented according to one exemplary embodiment of the disclosed systems and methods.

FIG. 4 is a flowchart diagram illustrating a method of accessing the applications APP1-APPN (or other content) of the web servers 206 using silent authentication implemented according to one embodiment of the present disclosure. At a first block 402, the user management server 210 detects a request to access content or an application (e.g., any one of APP1-APPN) on one of the web servers 206, such as by clicking a corresponding link in the resource page presented by the user management server 210. At next block 404, the user management server 210 gathers silent request message parameters for making the silent authentication or login request. The following Table 1 provides a list of the parameters formulating a message "M" for performing silent authentication according to one embodiment:

TABLE 1

Parameters Of Message "M" For Silent Authentication

| KEY NAME | VALUE | DESCRIPTION |
| --- | --- | --- |
| WA | wsignin | Request for Sign In |
| WTREALM | URL | Web Site Uniform Resource Locator |
| REQAPP | APP Name | Unique Short Name for each of the Applications APP1 - APPN |
| USER | Email Address | Email Address of User |
| EXP | Number of Seconds from beginning of Current Year + C | Expiry Parameter of the Site Token; C is a Constant |

In the embodiment of Table 1, the message M is a combination of the parameters, or M=WA&WTREALM&REQAPP&USER&EXP, and in which "&" denotes concatenation for separating the parameters. In general, WA is the request to access a desired application, WTREALM identifies the location or host of the application (e.g., URL of web server 206), REQAPP identifies the particular application or content being requested (e.g., an application name or the like), USER identifies the particular user (e.g., email address provided by federation server 204 or the data store system 212 depending upon user type), and EXP is an arbitrary expiry parameter adjusted by an arbitrary constant value C. In Table 1, EXP is an arbitrary expiry parameter defined as the number of seconds from beginning of the current year.

At next block 406, the user management server 210 uses a cryptographic function to compute or otherwise determine a cryptographic signature "SIGN" using the message M. In one embodiment, the cryptographic function is the HMAC (Hash-based Message Authentication Code) according to the following equation (1):

$$\text{SIGN}(K, M) = H((K' \oplus \text{OPAD}) \| H(K' \oplus \text{IPAD}) \| M) \quad (1)$$

in which "H" denotes a cryptographic hash function (e.g., according to HMAC-SHA256 or the like according to RFC 2104), "K" is a secret key, "K'" (or K prime) is a block-sized key derived from K either by padding to the right with 0's up to the block size or by hashing down to the to the block size (e.g., K'=H(K) if K is larger than the block size, and otherwise is padded using 0's), "∥" denotes concatenation, "⊕" denotes the binary logic function of bitwise exclusive-OR (XOR), OPAD is an outer padding consisting of repeated bytes (e.g., valued 0×5 C) up to the block size, IPAD is an inner padding consisting of repeated bytes (e.g., valued 0×36) up to the block size, and M is the message being cryptographically hashed.

After the cryptographic signature SIGN is determined at block 406, operation advances to block 408 in which the user management server 210 prepares and sends a modified message "M'" along with SIGN to the identity provider server 110, in which the modified message M' is a modified version of the message M. In one embodiment, the original message M is obscured by modifying at least one of the message parameters with at least one math function using at least one modifier variable. In the illustrated embodiment, EXP is the parameter that is modified, the modifier variable is a delta value δ, and the math function is addition. In one embodiment, the EXP is modified to EXP+δ, so that M'=WA&WTREALM&REQAPP&USER&(EXP+δ). The user management server 210 sends M' and SIGN to the identity server provider 110, or WA&WTREALM&REQAPP&USER&(EXP+δ)&SIGN.

Since the message and SIGN are shared between the user management server 210 and the identity provider server 208, if the message remains unmodified as in a conventional configuration, then an eavesdropper may copy the parameter and public key and encrypt a signature in order to appear as a legitimate user. Since the message M is instead obscured and sent as M', the likelihood of success of using the transmitted information in an attempt to appear as a legitimate user is substantially reduced. At next block 410, the identity provider server 208 receives a communication from the user management server 210 and determines at query block 412 whether the communication is a valid silent login (or silent authentication) request. For example, the identity provider server 208 determines whether the communication includes a message and a cryptographic signature (M'&SIGN). If not, then operation is complete.

If the identity provider server 208 detects at block 412 that the communication is a silent login request, then operation advances to block 414 in which the identity provider server 208 extracts the message parameters from the modified message M' received in the communication. Since the modified message M'=WA&WTREALM&REQAPP&USER&(EXP+δ), then the extracted parameters are WA, WTREALM, REQAPP, USER, and EXP+δ, in which the last parameter EXP has been modified by the modifier variable δ as previously described. At next block 416, the identity provider server 208 regenerates the original message M, such as by applying an inverse of the math function using the at least one modifier variable to the at least one modifier variable. In one embodiment, the EXP parameter is modified to EXP+δ, so that the identity provider server 208 simply subtracts the modifier variable δ from EXP+δ to obtain the parameter EXP of the original message. Thus, the identity provider server 208 uses an inverse of the math function (e.g., subtraction) to determine the original parameter in order to regenerate the original message.

At next block 418, the identity provider server 208 applies the cryptographic function on the original message M to generate a corresponding new cryptographic signature NEWSIGN. The cryptographic function used by the identity provider server 208 is the same cryptographic function used by the user management server 210 to generate SIGN, such as, for example, the HMAC function described in equation (1). At next block 420, it is queried whether the cryptographic signature SIGN received from the user management server 210 is the same as NEWSIGN calculated by the identity provider server 208, or whether SIGN=NEWSIGN. If not, then operation is terminated. Although not shown, the identity provider server 208 may send an error message to the user management server 210 indicating failure of authentication.

If, however, SIGN=NEWSIGN, then operation proceeds instead to block 422 in which the identity provider server 208 retrieves the valid site token for the web server 206 hosting the requested application identified in the original request received at block 402, and forwards the request and valid site token to the web server 206. It is noted that the message M identifies the website and the corresponding application along with the user requesting access. The site token provides the requisite credentials to provide access by the authorized user. The process illustrated by the flowchart of FIG. 4 may be repeated to allow the user 220 to access multiple applications for which the user 220 is authorized.

In summary, the identification provider application 162 may be used to configure an information handling system 100, such as that shown in FIG. 1, to operate as an identity provider server as further described herein, such as the identity provider server 208 of FIG. 2. Also, the user management application 164 may be used to configure an information handling system 100 to operate as an user management server as further described herein, such as the user management server 210 of FIG. 2. The identity provider server 208 and the user management server 210 are collectively configured within the identity management system 202 to perform the verification and authentication functions illustrated by the flowcharts of FIGS. 3 and 4 to enable authorized users, such as the user 220, to login and access the resources of the server platform 200, including silent authentication for accessing one or more of the applications APP1-APPN hosted on the web servers 206.

In order to perform successful silent authentication as described herein, the identity provider server 208 and the user management server 210 are each configured to use the same message format and corresponding message parameters of the message M, the same hashing function and corresponding secret key, and the same mathematical function and modification variable(s) (e.g., delta δ) to modify the same parameters of the message M.

The particular mathematical formula (e.g., addition) and modification variable (e.g., delta δ) illustrated for silent authentication are exemplary only. In various embodiments, the mathematical function may be different and more complex so long as an inverse mathematical function may be defined to reverse the message modification. Although only one modification variable is shown modifying one message parameter using one mathematical function, it is understood that multiple modification variables and mathematical functions may be used to modify any number of the message parameters. In other words, one or more of the message parameters may be modified by one or more modification variables using one or more mathematical functions for each parameter modification to generate the modified message M'.

It is noted that some mathematical functions may only apply to numeric-only parameters and may not be applicable to alphanumeric parameters. For example, the mathematical functions of addition and subtraction of a numeric variable may be applied to EXP, which is a numeric-only parameter. The concept of the mathematical function, however, may be extended to include modifications of any of the alphanumeric parameters as long as an inverse mathematical function may be defined to reverse the process to obtain the original parameter.

The identity tokens provided to the identity provider server 208 for user authentication and the site tokens provided to the subservient web servers 206 for silent authentication may be configured according to any one of multiple suitable protocols, such as HMAC with JSON (JavaScript Object Notation) Web Tokens (JWT), WS-Federation (web services) with Security Assertion Markup Language (SAML) or SAML2.0 (e.g., SAML or SAML2.0 tokens), WS-Federation with oAuth (Open Authentication) or oAuth2.0 tokens (in which oAuth2.0 gives back authorization code which can be embedded in a JSON response), etc. Assertions or claims in these different token formats may be digitally signed using X.509 Certificates that are verified upon request. Any one or more of the applications APP1-APPN may be hosted on any type of web server configuration, such as Azure (MicroSoft® Cloud Platform as a service), Google Cloud Platform, Amazon Web Services, etc.

It will be understood that the steps of shown and described herein are exemplary only, and that any combination of fewer, additional and/or alternative steps may be employed that are suitable for modifying startup or boot operation or boot flow of an processing system.

It will also be understood that one or more of the tasks, functions, or methodologies described herein (e.g., including those described herein for components 100, 162, 164, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. An identity management system, comprising:
   an identity provider server coupled to a user management server by a first network or a first communication bus;
   at least a first web server that is separate and different from the identity provider server and the user management server, the first web server being coupled to a second network that is different than the first network or first communication bus,
   where the identity provider server comprises a programmable integrated circuit that is programmed to:
      authenticate a user across the second network that is different than the first network or first communication bus, and then redirect the authenticated user across the second network to the user management server,
      then verify a silent authentication request on behalf of the authenticated user that is received across the first network or first communication bus from the user management server, the silent authentication request including a cryptographic signature and a modified message, and
      then provide a site token across the second network to the first web server that is separate and different from the identity provider server and the user management server in response to the verification of the silent authentication request, the site token being for access to a resource requested by the authenticated user, the requested resource running on the first web server that is separate and different from the identity provider server and the user management server; and where the user management server comprises a programmable integrated circuit that is programmed to:

present a resource page of access information across the second network to the authenticated user in response to the redirection of the authenticated user to the user management server from the identity provider server, the access information of the resource page being retrieved across the first network or the first communication bus from a data store system that is separate and different from the first web server and that lists at least one resource that is running on the first web server, then convert a resource request received across the second network from the authenticated user via the presented resource page into the silent authentication request by applying a cryptographic function to a message to provide the cryptographic signature and by applying a modification to the message to provide the modified message, the resource request being a request by the authenticated user for the at least one resource of the resource page that is running on the first web server, then send the silent authentication request to the identity provider server across the first network or first communication bus, and then redirect the authenticated user across the second network to access via the second network the requested resource that is running on the first web server; and where the cryptographic function and the modification are known only by the identity provider server and the user management server.

2. The identity management system of claim 1, wherein the message comprises a plurality of parameters, and wherein the modified message comprises the plurality of parameters including the modification applied to at least one of the plurality of parameters.

3. The identity management system of claim 2, wherein the modification comprises at least one math function using at least one modifier variable applied to the at least one of the plurality of parameters to generate at least one modified parameter.

4. The identity management system of claim 3, wherein the programmable integrated circuit of the user management server is programmed to apply the at least one math function using the at least one modifier variable to the at least one of the plurality of parameters to generate the at least one modified parameter, and wherein the programmable integrated circuit of the identity provider server is programmed to apply an inverse of the at least one math function using the at least one modifier variable to the at least one modified parameter to generate at least one unmodified parameter used to regenerate the message.

5. The identity management system of claim 1, wherein the cryptographic function comprises a cryptographic hash function applied to the message using a secret key to generate the cryptographic signature.

6. The identity management system of claim 1, further comprising:

a federation server that is separate and different from the identity provider server, the user management server, the data store system and the first web server, the federation server being coupled to the identity provider server only by the first network or the first communication bus, the programmable integrated circuit of the identity provider server being programmed to access the federation server across the first network or the first communication bus to obtain an identity token to authenticate the user when the user comprises a resource administrator or a privileged consumer; and where the data store system is coupled to the identity provider server only by the first network or the first communication bus, the programmable integrated circuit of the identity provider server being programmed to access the data store system across the first network or the first communication bus to obtain an identity token to authenticate the user when the user comprises a resource consumer.

7. The identity management system of claim 6, wherein the programmable integrated circuit of the identity provider server is programmed to:

authenticate the resource administrator or privileged consumer based on a predetermined trust relationship identified by access to an internal login link; and authenticate the resource consumer based on user credentials provided by the user.

8. The identity management system of claim 1, further comprising:

a plurality of subservient web servers that includes the first web server, the plurality of subservient web servers being coupled to the second network, each of the subservient web servers comprising a programmable integrated circuit and hosting at least one of a corresponding plurality of applications;

wherein the message identifies the first web server of the plurality of subservient web servers and one of the plurality of applications running on the first web server as the requested resource; and wherein the programmable integrated circuit of the identity provider server is programmed to provide a site token across the second network to the identified first web server of the plurality of subservient web servers to enable access to the one of the plurality of applications running on the first web server across the second network by the authenticated user.

9. An information handling system, comprising:

a programmable integrated circuit; and a memory storing an authentication application, which when executed by the programmable integrated circuit configures the information handling system into a silent authentication system;

wherein the silent authentication system processes a silent authentication request on behalf of a user by performing a cryptographic function on a message to provide a cryptographic signature, and by translating between the message and a modified message by either:

applying a modification to the message to provide the modified message, converting the resource request into the silent authentication request and including the modified message in the silent authentication request, and providing the silent authentication request including the modified message to a first network or first communication bus that is different than the second network, or receiving the modified message in the silent authentication request from across the first network or first communication bus that is different than the second network, and applying the modification to the modified message; and wherein the programmable integrated circuit is further programmed to:
  authenticate the user,
  present a resource page of access information across the second network to the authenticated user, the access information of the resource page being retrieved across the first network or the first communication bus from a data store system that is separate and different from a first web server and that lists a given resource that is running on the first web server,
  convert a resource request received across the second network from the authenticated user via the presented resource page into the silent authentication request,
  verify the silent authentication request on behalf of the authenticated user,
  provide a site token across the second network to the first web server in response to the verification of the silent authentication request, the site token being for access to the given resource requested by the authenticated user, the requested given resource running on the first web server, and
  redirect the authenticated user across the second network to access via the second network the requested given resource that is running on the first web server.

10. The information handling system of claim 9, wherein the message and the modified message each comprise at least one parameter, wherein the modification comprises at least one math function that uses at least one modification variable to modify the at least one parameter.

11. The information handling system of claim 9, wherein:
  the authentication application comprises a user management application that configures the information handling system into a user management server; and
  wherein in response to the resource request provided across the second network, the user management server applies the cryptographic function to the message to provide the cryptographic signature, applies the modification to the message to provide the modified message, and transmits the cryptographic signature and the modified message as the silent authentication request across the first network or first communication bus.

12. The information handling system of claim 11, wherein the message comprises at least one parameter, and wherein the modification comprises at least one math function that uses at least one modifier variable to modify the at least one parameter to convert the message into the modified message.

13. The information handling system of claim 9, wherein:
  the authentication application comprises an identification provider application that configures the information handling system into an identity provider server; and
  wherein the identity provider server receives from across the first network or first communication bus the silent authentication request comprising the cryptographic signature and the modified message, applies the modification to the modified message to regenerate the original message, applies the cryptographic function to the original message to generate a new cryptographic signature, and compares the new cryptographic signature with the received cryptographic signature to authenticate the silent authentication request.

14. The information handling system of claim 13, wherein the modified message comprises at least one modified parameter, and wherein the modification comprises at least one inverse math function that uses at least one modifier variable to convert the at least one modified parameter into at least one original parameter to regenerate the message from the modified message.

15. The information handling system of claim 9, wherein the cryptographic function comprises a cryptographic hash function applied to the message using a secret key to generate the cryptographic signature.

16. A method, comprising:
  authenticating a user across a second network;
  retrieving access information from a data store system across a first network or a first communication bus that is different from the second network, the access information being for at least one resource running on a first web server that is coupled to communicate with the user across the second network, and the data store system being separate and different from the first web server;
  presenting a resource page of the retrieved access information across the second network to the authenticated user;
  receiving a resource request from the authenticated user across the second network via a user selection entered to the presented resource page, the resource request being for access to a given resource running on the first web server; and
  responding to receipt of the resource request by:
    applying a cryptographic function on a message to provide a cryptographic signature,
    modifying a message by applying a modification to provide a modified message,
    sending the cryptographic signature and the modified message across a first network or first communication bus that is different than the second network as a silent authentication request,
    verifying the silent authentication request on behalf of the authenticated user,
    providing a site token across the second network to the first web server in response to the verification of the silent authentication request, the site token being for access to the given resource requested by the authenticated user that is running on the first web server, and
    redirecting the authenticated user across the second network to access via the second network the requested given resource that is running on the first web server.

17. The method of claim 16, wherein the modifying a message comprises applying at least one math function using at least one modifier variable to at least one parameter of the message.

18. The method of claim 16, further comprising:
  receiving the silent authentication request from across the first network or first communication bus;
  reversing the modification to the modified message to regenerate the message;
  applying the cryptographic function on the regenerated message to provide a new cryptographic signature; and
  comparing the received cryptographic signature with the new cryptographic signature to authenticate the silent authentication request.

19. The method of claim 18, wherein the reversing the modification comprises applying an inverse of at least one math function using at least one modifier variable on at least one parameter of the modified message.

20. The method of claim 16, wherein the applying a cryptographic function comprises applying a cryptographic hash function to the message using a secret key to generate the cryptographic signature.

21. The identity management system of claim 1, where the resource page presents one or more authorized links to corresponding applications running as resources running on one or more web servers coupled to the second network for which the authorized user is authorized by access information of the data store system to access, the one or more links including a link to the application of the at least one resource that is running on the first web server; and where the programmable integrated circuit of the user management server is programmed to detect a selection by the authenticated user of the presented resource page link to the application of the at least one resource that is running on the first web server as the request by the authenticated user for access to the application of the at least one resource of the resource page that is running on the first web server.

22. The information handling system of claim 9, where the resource page presents one or more authorized links to corresponding applications running as resources on one or more web servers coupled to the second network for which the authorized user is authorized by access information of the data store system to access, the one or more links including a link to the application of the given resource that is running on the first web server; and where the programmable integrated circuit is programmed to detect a selection by the authenticated user of the presented resource page link to the application of the given resource that is running on the first web server as the request by the authenticated user for the application of the given resource of the resource page that is running on the first web server.

23. The information handling system of claim 9, where the data store system is coupled to communicate with the programmable integrated circuit only by the first network or the first communication bus.

24. The method of claim 16, where the resource page presents one or more authorized links to corresponding applications running as resources on one or more web servers coupled to the second network for which the authorized user is authorized by access information of the data store system to access, the one or more links including a link to the application of the given resource that is running on the first web server; and where the method further comprises detecting a selection by the authenticated user of the presented resource page link to the application of the given resource that is running on the first web server as the request by the authenticated user for the application of the given resource of the resource page that is running on the first web server.

25. The method of claim 16, where the data store system is coupled to communicate the access information only by the first network or the first communication bus.

* * * * *